US011405578B2

(12) United States Patent
Siddalinga et al.

(10) Patent No.: US 11,405,578 B2
(45) Date of Patent: Aug. 2, 2022

(54) TRANSMISSION OF AUDIO STREAMS

(71) Applicant: NAGRAVISION S.A., Cheseaux-sur-Lausanne (CH)

(72) Inventors: Swamy Siddalinga, Cheseaux-sur-Lausanne (CH); Kumar Nishant, Cheseaux-sur-Lausanne (CH); Chawandi Prabhu, Cheseaux-sur-Lausanne (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 0 days.

(21) Appl. No.: 17/148,780

(22) Filed: Jan. 14, 2021

(65) Prior Publication Data

US 2021/0243402 A1    Aug. 5, 2021

Related U.S. Application Data

(63) Continuation of application No. 15/798,708, filed on Oct. 31, 2017, now abandoned.

(30) Foreign Application Priority Data

Nov. 4, 2016   (EP) ..................... 16197288

(51) Int. Cl.
*H04N 5/60* (2006.01)
*H04N 5/62* (2006.01)
(Continued)

(52) U.S. Cl.
CPC .............. *H04N 5/607* (2013.01); *H04N 5/45* (2013.01); *H04N 5/62* (2013.01);
(Continued)

(58) Field of Classification Search
CPC ............ H04N 5/607; H04N 5/45; H04N 5/62; H04N 21/4856; H04N 21/8106; H04W 4/80
(Continued)

(56) References Cited

U.S. PATENT DOCUMENTS 8,505,054 B1    8/2013 Kirley
2004/0042413 A1    3/2004 Kawamura
(Continued)

FOREIGN PATENT DOCUMENTS

EP         1416728       5/2004
WO    2016/011016       1/2016

OTHER PUBLICATIONS

"Advanced Audio Distribution Profile Specification" Adopted version 1.0, Audio Video working Group, dated May 22, 2003, 75 pages.
(Continued)

*Primary Examiner* — Michael Lee
(74) *Attorney, Agent, or Firm* — Polsinelli LLP

(57) ABSTRACT

A system and method of transmitting respective audio streams to a plurality of end points, such as headphones, earphones, headsets, speakers, etc. is disclosed. Different audio streams are transmitted to each of the plurality of end points. The end points may be arranged to audibly output received audio streams, and so each end point may audibly output a respective different audio stream, i.e. the respective audio streams may be mutually different from each other.

18 Claims, 8 Drawing Sheets

(51) Int. Cl.
*H04N 5/45* (2011.01)
*H04N 21/81* (2011.01)
*H04N 21/485* (2011.01)
*H04W 4/80* (2018.01)

(52) U.S. Cl.
CPC ..... *H04N 21/4856* (2013.01); *H04N 21/8106* (2013.01); *H04W 4/80* (2018.02)

(58) Field of Classification Search
USPC ......................................................... 348/565
See application file for complete search history.

(56) References Cited

U.S. PATENT DOCUMENTS

| | | | |
|---|---|---|---|
| 2008/0025414 A1* | 1/2008 | Kim | H04N 21/2383 375/240.26 |
| 2009/0007194 A1 | 1/2009 | Bradley, Jr. et al. | |
| 2014/0118616 A1 | 5/2014 | Oughriss | |
| 2014/0161274 A1* | 6/2014 | Singamsetty | H04R 1/1041 381/74 |
| 2015/0208161 A1 | 7/2015 | Lesaffre | |
| 2015/0219578 A1 | 8/2015 | Gellert | |
| 2015/0280670 A1 | 10/2015 | Kauffmann | |
| 2015/0296247 A1 | 10/2015 | Glasser | |
| 2015/0319518 A1 | 11/2015 | Wilson | |
| 2015/0319557 A1* | 11/2015 | El-Hoiydi | H04L 1/1657 455/41.2 |
| 2016/0142785 A1 | 5/2016 | Nguyen | |
| 2016/0205148 A1 | 7/2016 | Lee | |
| 2016/0323482 A1 | 11/2016 | Chung | |
| 2018/0027034 A1 | 1/2018 | Goupy | |
| 2018/0027368 A1* | 1/2018 | Girardier | H04M 1/72412 455/41.2 |
| 2018/0131894 A1 | 5/2018 | Siddalinga et al. | |

OTHER PUBLICATIONS

Extended European Search Report for Application No. EP 16197288.0 dated May 12, 2017, 6 pages.
Non-Final Office Action dated Apr. 19, 2018 for U.S. Appl. No. 15/798,708, 6 pages.
Non-Final Office Action dated Nov. 6, 2018 for U.S. Appl. No. 15/798,708, 7 pages.
Final Office Action dated Mar. 11, 2019 for U.S. Appl. No. 15/798,708, 7 pages.
Non-Final Office Action dated Oct. 30, 2019 for U.S. Appl. No. 15/798,708, 7 pages.
Final Office Action dated Apr. 20, 2020 for U.S. Appl. No. 15/798,708, 7 pages.

* cited by examiner

TRANSMISSION OF AUDIO STREAMS

RELATED APPLICATIONS

This application is a continuation of U.S. patent application Ser. No. 15/798,708, filed Oct. 31, 2017, which claims the benefit of European Patent Application No. 16197288.0, filed Nov. 4, 2016, both of which are incorporated herein by reference in their entirety for all purposes.

FIELD OF THE INVENTION

The present disclosure relates to a system and method of transmitting respective audio streams to a plurality of end points. More particularly, but not exclusively, the present disclosure uses wireless data connections, such as Bluetooth, to transmit the respective audio streams.

BACKGROUND

Media content items, such as television programs and movies, are generally available with a video stream and a plurality of associated audio streams. For example, the audio streams may be arranged for different numbers of speaker channels and/or may be in different languages. Typically, a media content item is output to users using only one of the plurality of audio streams.

However, for example, if a family is watching the same television program, and different members of the family are fluent in different languages, each family member may want to listen to an audio stream for the program in a selected language. Accordingly, different members of the family may want to listen to the program in different languages. Typically, subtitles are used to enable different viewers to experience the same program in different languages, with the audio in a first language, and the subtitles in a second language.

BRIEF DESCRIPTION OF THE DRAWINGS

Exemplary embodiments of the disclosure shall now be described with reference to the drawings in which.

DETAILED DESCRIPTION OF THE DRAWINGS

Figure 1:
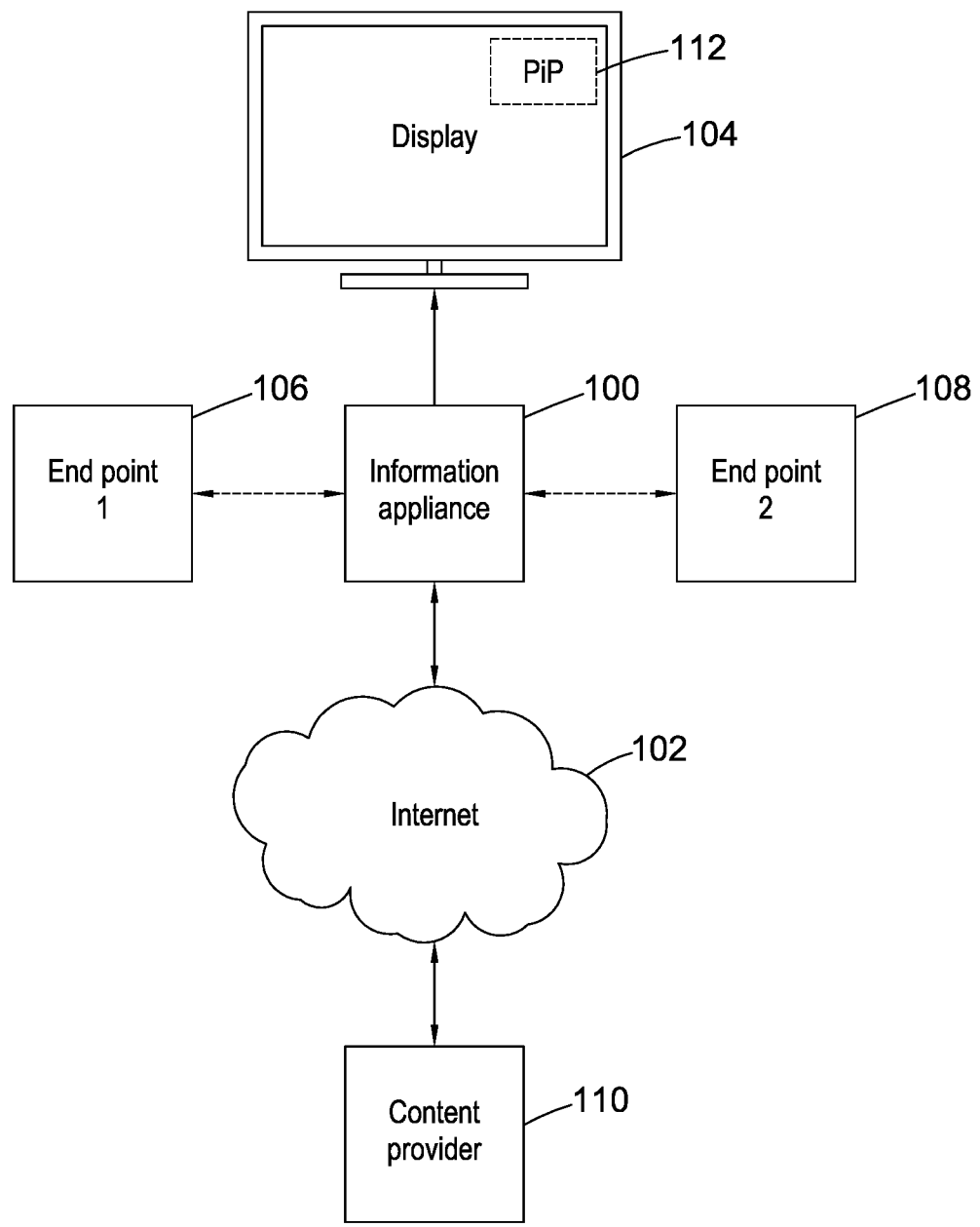
FIG. 1 illustrates an environment in which transmission of respective audio streams to a plurality of end points is taking place.

In overview, a system and method of transmitting respective audio streams to a plurality of end points, such as headphones, earphones, headsets, speakers, etc. is disclosed. Different audio streams are transmitted to each of the plurality of end points. The end points may be arranged to audibly output received audio streams, and so each end point may audibly output a respective different audio stream, i.e. the respective audio streams may be mutually different from each other.

In some aspects of the disclosure, a method of simultaneously transmitting respective audio streams to a first end point and a second end point using an information appliance such as a set-top box. The information appliance is configured to cause display of a first video stream. The method comprises associating a first audio stream with the first end point and a second audio stream with the second end point. The first audio stream is associated with the first video stream. The first audio stream is transmitted by the information appliance to the first end point and the second audio stream is transmitted at the same time by the information appliance to the second end point.

Advantageously, the method enables efficiency savings by reducing hardware required by using one information application compared to using a respective information appliance to transmit each respective audio stream to each end point.

In some embodiments, the second audio stream is also associated with the first video stream. The second audio stream may, for example, be in a different language to the first audio stream. Accordingly, each end point may audibly output audio streams related to the first video stream in different languages. Advantageously, when using one information application to transmit both the first and the second audio streams, the audio streams may be kept in synchronize with the first video stream. This eliminates any potential lag between the video stream and the audio streams that may be caused when using a respective information appliance to transmit a respective audio stream to each end point.

In some embodiments, the information appliance causes the display of a second video stream together with the first video stream, for example in a Picture-in-Picture or split stream arrangement. The second audio stream is associated with the second video stream, different from the first video stream. Accordingly, in these embodiments, a difference between the first audio stream and the second audio stream is that they are each associated with a different respective video stream. Each end point may thus simultaneously audibly output audio streams corresponding to different video streams. Advantageously, the method enables efficiency savings by reducing hardware required by using one information application compared to using a respective information appliance to cause the display of a first and a second video stream, and transmit a first audio stream associated with the first video stream to the first end point, and a second audio stream associated with the second video stream to the second end point.

Further aspects of the disclosure relate to a system for simultaneously transmitting respective audio streams to a first end point and a second end point. The system, such as a set-top box, comprises means for causing display of a first video stream, means for associating a first audio stream with the first end point and a second audio stream with the second end point. The means for causing display and/or the means for associating may be a processor. The first audio stream is associated with a first video stream. The system further comprises means for simultaneously transmitting the first audio stream to the first end point and the second audio stream to the second end point. The means for transmitting may be a transmitter.

Yet further aspects of the disclosure relate to a non-transitory computer readable medium having computer-executable instructions to cause a computer system to perform the method of transmitting respective audio streams to a first end point and a second end point.

It will be appreciated that causing display of the video stream(s) by the information appliance/system may comprise sending the video stream(s) to a display device. The display device may, of course, be separate from or integrated with the appliance/system. For example, the information appliance/system may comprise a video output, for example an HDMI, RGB or composite output, and be arranged to output the video stream(s) over the video output for display by a display device.

Some specific embodiments are now described by way of illustration with reference to the accompanying drawings in which like reference numerals refer to like features.

With reference to FIG. 1, an information appliance 100 is connected to each of the internet 102, a display device 104, e.g. a television, a first end point 106 and a second end point 108. The information application 100, for example, a set-top box (STB) for a television, may be connected to the internet 102 via a modem. In some embodiments, the information application may comprise an integrated display device, for example a smart television.

Figure 3:
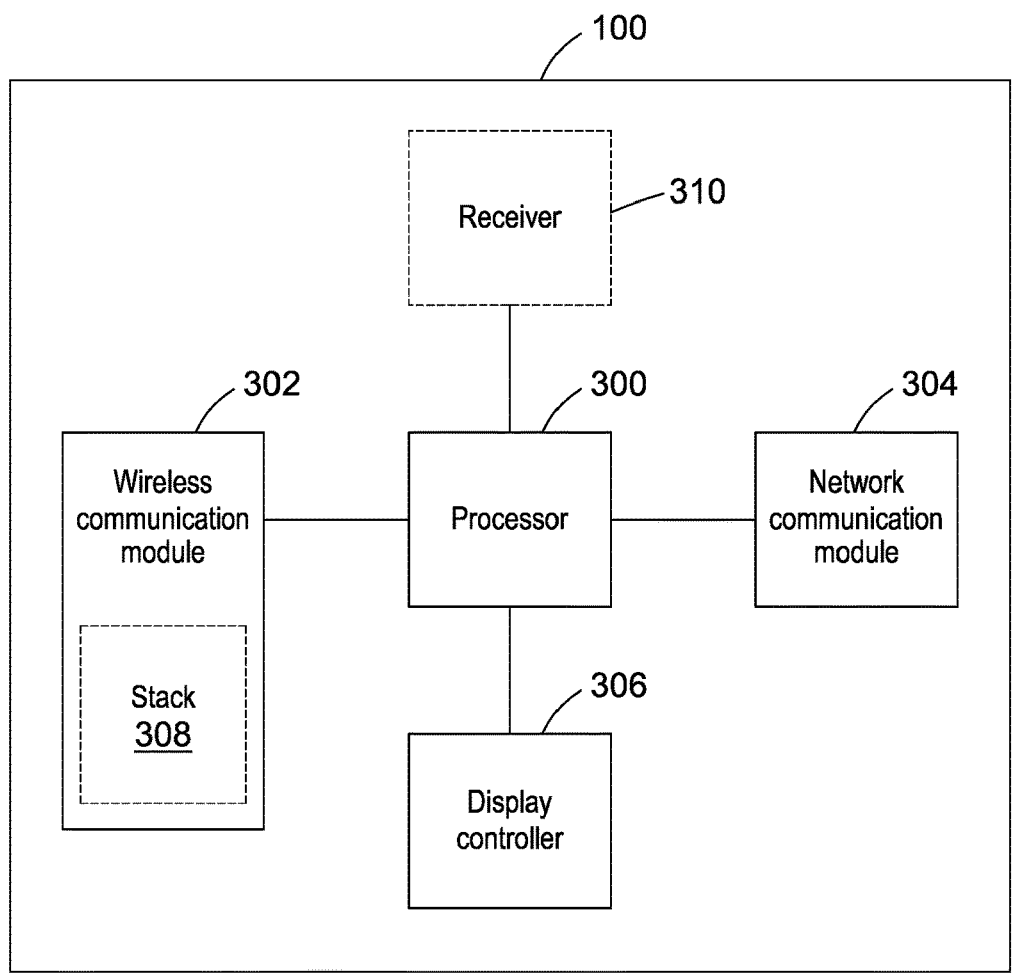
FIG. 3 illustrates a system for transmitting respective audio streams to a plurality of end points.

The information appliance 100 receives media content from the internet 102, the media content having one or more audio streams and a video stream. For example, a content provider 110 is connected to the internet 102, and the information appliance 100 may be arranged to connect to the content provider 110 via the internet 102. In some embodiments, the information application device comprises a receiver 310 as shown in FIG. 3, arranged to receive media content in the form of digital and/or analogue broadcast signals, for example over the air broadcast signals, satellite television signals, or cable television signals. It is to be understood that in some embodiments, the information appliance 100 may receive media content from other sources, such as optical media including a LaserDisc, a DVD, an HD DVD, or a Blu-ray disc, or from a data storage device including a USB flash drive, a hard disc drive or a solid state drive.

The first and second end points 106, 108 may each be, for example, a headphone, an earphone, a speaker, a set of speakers, or a headset. The first and second end points 106, 108 each connect to the information appliance 100 using a wireless data connection such as Bluetooth, WiFi or a proprietary protocol. In some embodiments, the end points 106, 108 each connect to the information appliance 100 using a physical data connection. The information appliance 100 is arranged to transmit respective audio streams to each of the first and second end points 106, 108 over their corresponding connections.

The information appliance 100 is arranged to output the video stream to the display device 104. The display device 104 is arranged to display a video stream from the information appliance 100. In some embodiments, the information appliance 100 is arranged to simultaneously output two video streams, for example in a Picture-in-Picture (PiP) window 112 or a split screen arrangement, so that they are displayed accordingly by the display device 104. The display device 104 may be a television connected to the information appliance 100 by a connection using, for example, an HDMI, a SCART or an RCA. The display device 104 may also be arranged to audibly output an audio stream received from the information appliance 100. Of course, the display device may be integrated with the information appliance, for example in a smart TV set.

Figure 2:
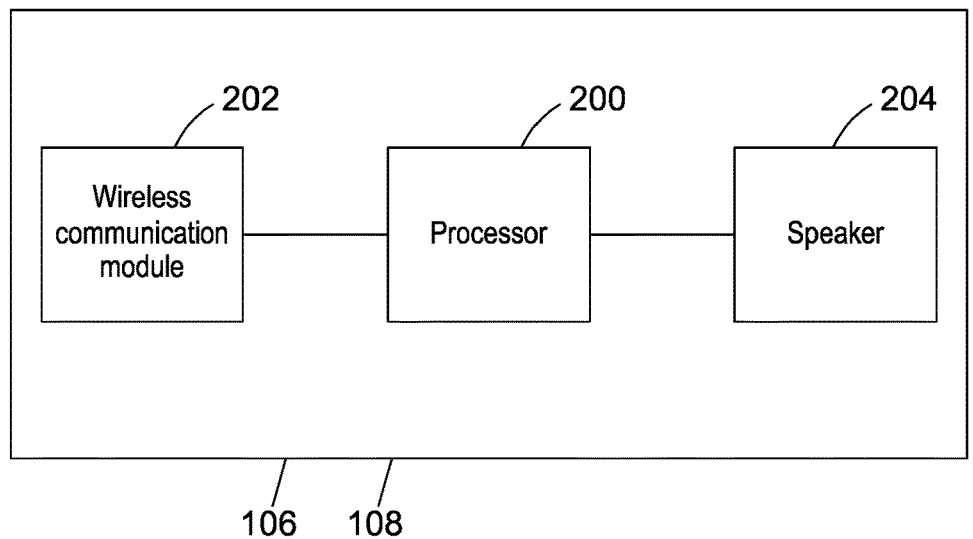
FIG. 2 illustrates a system for receiving an audio stream.

With reference to FIG. 2, the first and second end points 106, 108 each comprise a processor 200, a wireless communication module 202 and a speaker 204. The wireless communication module 202 is arranged to connect to the information appliance 100, and receive audio data. The speaker 204 is arranged to audibly output received audio data. The processor 200 is configured to coordinate between the wireless communication module 202 and the speaker 204.

With reference to FIG. 3, the information appliance 100 comprises a processor 300, a wireless connection module 302, a network communication module 304, e.g. a network adaptor, and a display controller 306. The wireless communication module 302 is arranged to connect to the first and second end points 106, 108, and transmit audio data. The wireless communication module 302 may comprise a stack 308. The stack 308 comprises a protocol under which the wireless communication module 302 operates. The network communication module 304 is arranged to connect to the internet 102. The display controller 306 is arranged to process received media content (demultiplexing, decoding, etc) to generate one or more video steams corresponding to respective media content items for output to the display device 104. The processor 300 is configured to coordinate between the wireless communication module 302, the network communication module 304, and the display controller 306.

Figure 4:
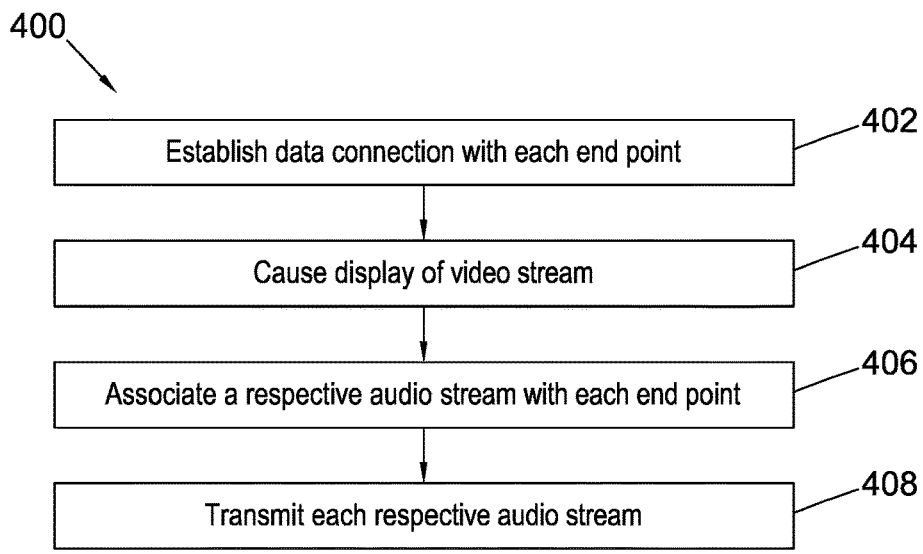
FIG. 4 illustrates a flow chart of a method of transmitting respective audio streams to a plurality of end points.

A method 400 of transmitting respective audio streams to each of the first and second end points 106, 108 is now described with reference to FIG. 4. At step 402, the information appliance 100 establishes a data connection with each end point 106, 108, i.e. between the wireless connection module 302 of the information appliance 100 and the wireless communication modules 202 of the end points 106, 108.

At step 404, the display controller 306 of the information appliance 100 causes a video stream to be output. At step 406, the information appliance 100 associates a respective audio stream with each end point 106, 108. The respective audio streams are different to each other, and one of the audio streams is associated with the video stream. In other words, a first audio stream is associated with the first end point 106 and a second audio stream is associated with the second end point 108, and the first audio stream is associated with the video stream. At step 408, the respective audio streams are transmitted at the same time by the wireless connection module 302 to its associated end point 106, 108 over the corresponding data connection. Each end point may output the received audio stream via its speaker 204.

In general, a media content item comprises one or more audio streams and a video stream. If there are two or more audio streams in the media content item, the audio streams may be in different languages to each other. In some embodiments, the audio streams are both part of the same media content item, and are thus both associated with one video stream. In such embodiments, the respective audio streams are different to each other with respect to the language of the audio streams. Accordingly, each end point 106, 108 can audibly output audio streams in different languages, for example, simultaneously with the one video stream. An example implementation of this is described below with reference to FIG. 5. In some embodiments, each audio stream is from a different media content item and thus each audio stream is associated with a respective video stream. In such embodiments, the respective audio streams are different to each other with respect to their associated video streams. Accordingly, each end point 106, 108 can simultaneously audibly output audio streams corresponding to different video streams. An example implementation of this is described below with reference to FIG. 6.

A method 500 of transmitting respective audio streams to each of the first and second end points 106, 108 is now described with reference to FIG. 5. In the method 500, the respective audio streams are associated with the same video content.

Figure 5:
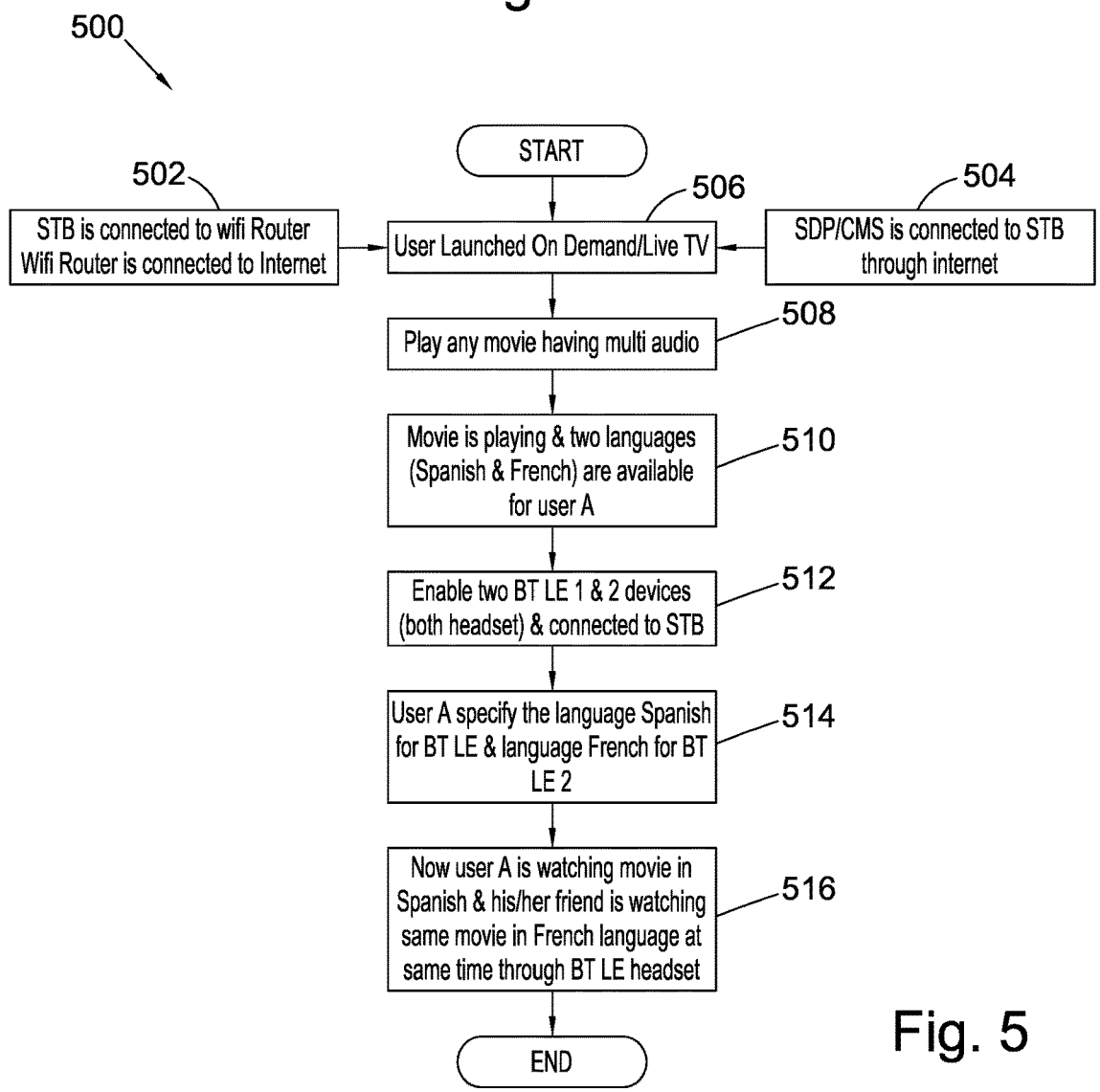
FIG. 5 illustrates a flow chart of a method of providing two end points with different respective audio streams, the audio streams associated with the same video content.

Turning to FIG. 5, at step 502, the network communication module 304 of the information appliance 100 establishes a connection to the internet 102 via a router and modem. At step 504, the information appliance 100 establishes a connection, via the internet 102, to a content provider 110 such as a service delivery platform (SDP) or a content management system (CMS). At step 506, the information appliance 100 receives media content, for example an on-demand television program or a live television broadcast. The media content includes a video stream and two audio streams, a first audio stream and a second audio stream. Other sources of media content are described above.

At step 508, the processor 300 of the information appliance 100 processes the media content for audio-visual output. In other words, the media content is 'played' such that the video stream and either the first or the second audio stream is output via the display controller 306 to the display device 104. At optional step 510, a first user chooses one of the two audio streams to be output by the display device 104. In the example of FIG. 5, the first audio stream is in Spanish, and the second audio stream is in French. In other words, at optional step 510, the first user selects the language, between French and Spanish that is output via the display device 104. Optional step 510 may be omitted, i.e. neither audio stream may be output to the display device 101, or the information application 100 may output one of the two audio streams based on a pre-configured language setting.

At step 512, the information appliance 100 establishes a data connection with each end point 106, 108, i.e. between the wireless connection module 302 of the information appliance 100 and the wireless communication modules 202 of the end points 106, 108. In the example of FIG. 5, the end points 106, 108 are both Bluetooth devices, such as Bluetooth low energy headsets.

At step 514, the first user specifies a respective one of the two audio streams for each end point 106, 108. In the example of FIG. 5, the first user specifies the first audio stream in Spanish for the first end point 106, and the second audio stream in French for the second end point 108. The display device 104 continues to output the video stream, and the audio output of the display device 104 may continue to be output, or may be disabled. At step 516, the information appliance 100 transmits the first audio stream to the first end point 106, and the second audio stream to the second end point 108 over the corresponding data connection. The end points 106, 108 then output their received audio stream. The first user uses the first end point 106 and a second user uses the second end point 108. Accordingly, in the example of FIG. 5, the first user is able to listen to the Spanish-language audio stream corresponding to the video stream, and the second user is able to listen to the French-language audio stream corresponding to the video stream.

Figure 6:
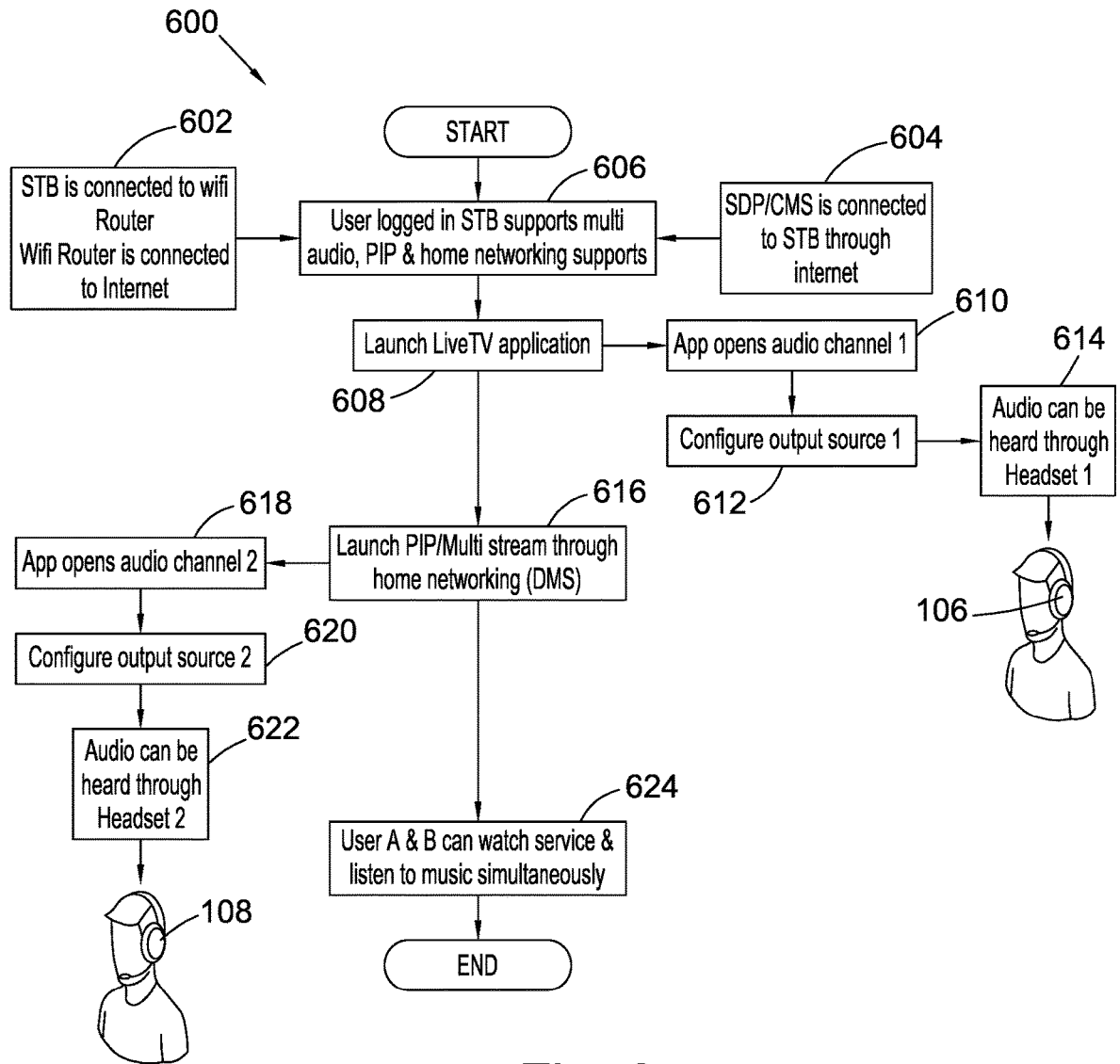
FIG. 6 illustrates a flow chart of a method of providing two end points with different respective audio streams, the audio streams associated with different video content.

A method 600 of transmitting respective audio streams to each of the first and second end points 106, 108 is now described with reference to FIG. 6. In the method 600, a first audio stream is still associated with the first video stream but the second audio stream is associated with a second video stream Turning to FIG. 6, at step 602, the network communication module 304 of the information appliance 100 establishes a connection to the internet 102 via a router and modem. At step 604, the information appliance 100 establishes a connection, via the internet 102, to a content provider 110 such as an SDP or a CMS. At step 606, a user account associated with the content provider 110 is logged into at the information appliance 100. The user account enables the information appliance 100 to access media content from the content provider 110 including a first television program and a second television program, as well as simultaneous display of two video streams, for example in a PiP or a split screen arrangement. Other sources of media content are described above and, for example, the media content may include multi-language audio content. At step 608, the information appliance 100 receives media content, for example an on-demand television program or a live television broadcast. Accordingly, the first video stream corresponding to the first television program is output by the display controller 306 to the display device 104.

At step 610, the information appliance 100 receives from the content provider 110 the first audio stream associated with the first video stream. At step 612, the information appliance 100 establishes a data connection with the first end point 106 between the wireless connection module 302 of the information appliance 100 and the wireless communication module 202 of the first end point 106. At step 614, the first audio stream is transmitted to, and output by, the first end point 106.

At step 616, the second video stream corresponding to the second television program is output by the display controller 306 to the display device 104 at the same time as the first video stream, for example as a PiP window 112. At step 618, the information appliance 100 receives from the content provider 110 the second audio stream associated with the second video stream. At step 620, the information appliance 100 establishes a data connection with the second end point 108 between the wireless connection module 302 of the information appliance 100 and the wireless communication module 202 of the second end point 108. At step 622, the second audio stream is transmitted to, and output by, the second end point 108.

At step 624, a first user is able to listen to the first audio stream using the first end point 106 and watch the first video stream on the display device 104, and a second user is able to listen to the second audio stream using the second end point 106 and watch the second video stream on the display device 104. In other words, steps 608, 610, 612, and 614 occur substantially simultaneously to steps 616, 618, 620 and 622, and can occur in any order.

In some embodiments, the data connections between the information appliance 100 and each end point 106, 108 are Bluetooth connections, for example, using the adopted specification known in the art as Bluetooth Core Specification 2.1 with enhanced data rate, incorporated herein by reference. In other words, the data connections established at steps 402, 512, 612 and 620 may use Bluetooth protocols between the wireless connection module 302 of the information appliance 100 and the wireless communication module 202 of the end points 106, 108. In embodiments where the data connections are Bluetooth connections, the stack 308 used to operate the wireless communication module 302 of the information appliance 100 is a Bluetooth stack 700 as illustrated in FIG. 7.

Figure 7:
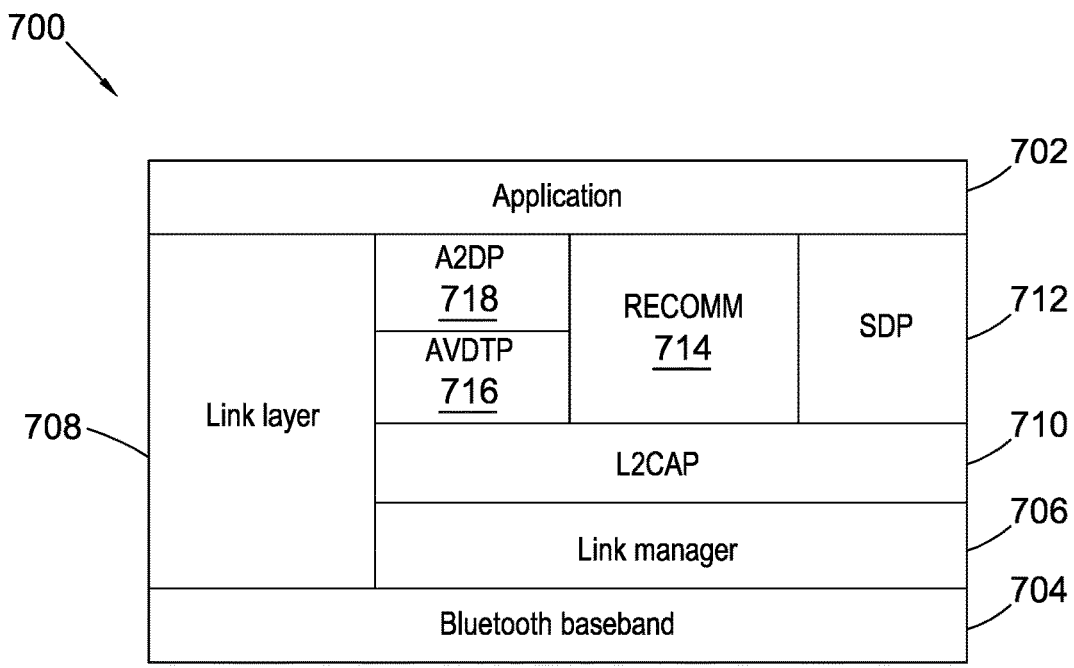
FIG. 7 illustrates an example stack of the system of FIG. 3.

With reference to FIG. 7, the Bluetooth stack 700 comprises an application layer 702, a Bluetooth baseband 704, a link manager 706, a link layer 708, a Logical Link Control and Adaptation Protocol (L2CAP) 710, a Service Discovery Protocol (SDP) 712, a (RFCOMM) 714, an Audio Video Distribution Transport Protocol (AVDTP) 716 and an Advanced Audio Distribution Profile (A2DP) 718. The wireless communication modules 202 of the end points 106, 108 may comprise corresponding protocol stacks that are substantially the same as the stack 700.

The application layer 702 is arranged to interact with external software applications, for example an application to process a media content stream such as an MPEG stream for a television broadcast received from the content provider 110. The Bluetooth baseband 704 is arranged to encode and decode Bluetooth packets. The link manager 706 is arranged above the Bluetooth baseband 704 to create, modify and release logical links, as well as update parameters related to physical links between devices, e.g. end points 106, 108.

The link layer 708 is arranged between the application layer 702 and the Bluetooth baseband 704. The link layer 708 may be a Synchronous Connection Oriented (SCO) link or an Asynchronous Connection-Less (ACL) link. An SCO link is symmetrical point-to-point circuit switched connection, as they reserve slots, with up to 64 kbps bandwidth, used in guaranteed service like voice. With SCO, the wireless connection module 302 of the information appliance 100 can support typically up to three links with the same end point 106, 108 or up to three different end points 106, 108. An ACL link can support point-to-multipoint communication with up to 723 kbps bandwidth one direction, which is suitable for streaming audio.

The L2CAP 710 is arranged to segment and assemble data packets and transport data packets to higher layer protocols. The L2CAP 710 is arranged above the link manager 706. The SDP 712 is arranged to publish supported Bluetooth capabilities of the wireless communication module 302, and to query other Bluetooth devices for their capabilities. The SDP 712 is arranged between the L2CAP 710 and the application layer 702. The RFCOMM 714 is arranged to send and receive data and comprises a set of transport protocols, made on top of the L2CAP protocol 710. The RFCOMM 714 is arranged between the L2CAP 710 and the application layer 702.

The AVDTP 716 is arranged above the L2CAP 710. As described above, the information appliance 100 establishes data connections with each end point 106, 108, between the wireless connection module 302 of the information appliance 100 and the wireless communication modules 202 of the end points 106, 108. Accordingly, the AVDTP 716 is arranged to support connections to a plurality of end points 106, 108 simultaneously. The AVDTP 716 is discussed in greater detail below with reference to FIG. 9. The A2DP 718 is arranged between the AVDTP 716 and the application layer 702. The A2DP 718 is arranged to transfer audio streams, and comprises audio codecs. The A2DP 718 has a fixed bandwidth for audio stream data and this fixed bandwidth is divided across the number of data connections with end points 106, 108. In some embodiments, a plurality of A2DP 718 layers may be used to maintain a minimum bandwidth for each audio stream.

The A2DP 718 may be configured as is known in the art, for example in "ADVANCED AUDIO DISTRIBUTION PROFILE SPECIFICATION", Adopted version 1.0, by the Bluetooth Audio Video Working Group, dated 22 May 2003, incorporated herein by reference, and in which Chapter 13 defines signalling flows. L2CAP signalling channels may be established which help in setting up streaming data connections. As part of a setup procedure, L2CAP transport channel may be established, which carry media packets.

The AVDTP 716 may be configured as is known in the art, for example in "AUDIO/VIDEO DISTRIBUTION TRANSPORT PROTOCOL SPECIFICATION", Adopted version 1.0, by the Bluetooth Audio Video Working Group, dated 22 May 2003, incorporated herein by reference, and in which Chapter 2 discusses an A/V Distribution Stack. In the A/V Distribution Stack, end points one of media type AUDIO and other of type VIDEO may be configured. The remote end points may be on the same device or on different devices. Additionally, Chapter 1.2 of this reference provides an overview of the AVDTP 716, and FIG. 2.1 discusses an Upper Layer using AVDTP services, i.e. A2DP 718.

Figure 8:
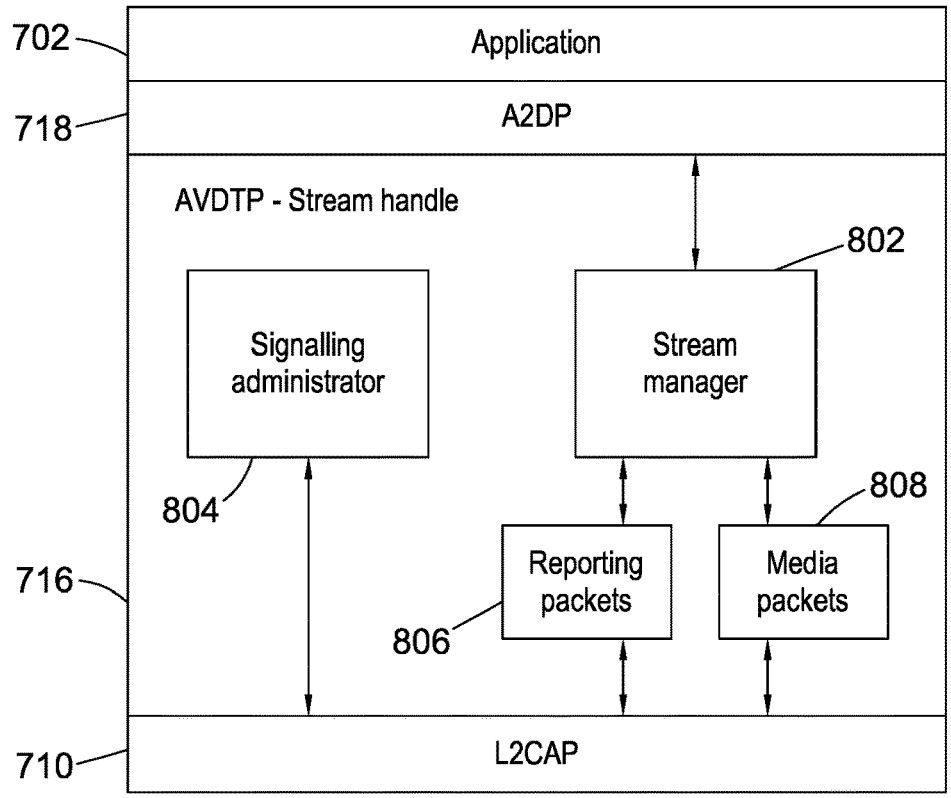
FIG. 8 illustrates an example sub-module of the stack of FIG. 7.

With reference to FIG. 8, the AVDTP 716 comprises a stream manager 802 and a signalling administrator 804. The stream manager 802 is arranged to assign Stream End Point Identifiers (SEIDs) to end points 106, 108. The application layer 702 stores the SEIDs of the end points 106, 108 and can address audio streams to different end points 106, 108 using the corresponding SEID of the end point. Reporting packets 806 and media packets 808 are communicated between the L2CAP 710 and the stream manager 802. The signalling administrator 804 is arranged to configure data connections between the information appliance 100 and the end points 106, 108.

The Bluetooth stack 700 is arranged to carry out a stream management signalling procedure 900 described with reference to FIG. 9. The stream management signalling uses an L2CAP channel using the L2CAP 710. The L2CAP channel is established over the ACL link with a Protocol Service Multiplexer Value (PSM) allocated for AVDTP transactions in the link layer 708.

Figure 9:
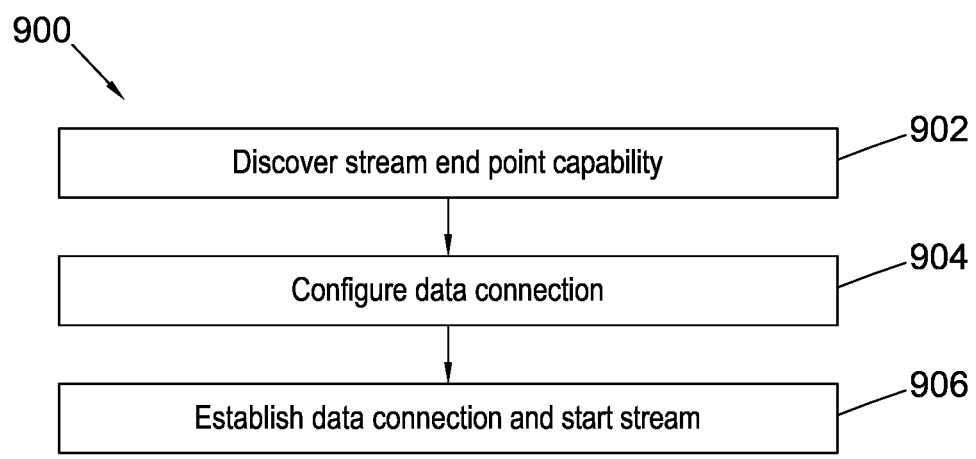
FIG. 9 illustrates a flow chart of a method of stream management signalling.

Turning to FIG. 9, at step 902, the signalling administrator 804 determines the capabilities of the stream end points (i.e. end points 106, 108). The result of this step provides a list of stream end points along with the media types, i.e. audio and/or video, that the end points 106, 108 support. Using an SEID assigned by the stream manager 802 as a reference for each end point 106, 108, the signalling administrator 804 queries the media codec capabilities of the end points 106, 108 using a get capabilities procedure. In other words, an SEID is assigned to each pair of end point and audio stream.

At step 904, the signalling administrator 804 configures a data connection to connect the information appliance 100 and an end point 106, 108. The signalling administrator 804 selects the desired end point 106, 108 and obtains its capabilities for receiving an audio stream based on the get capabilities procedure and the SEID of the end point 106, 108. The signalling administrator 804 then configures the data connection device using a set configuration procedure. Step 904 is repeated to configure each data connection to connect the information appliance 100 and each end point 106, 108.

At step 906, the stream manager 802 establishes the data connections configured in step 904 and corresponding transport sessions for media packets 808 and reporting packets 806. In other words, the SEIDs are used to transmit respective data for each audio stream to the corresponding end point. A new L2CAP channel may be established and uniquely mapped to each transport session. The L2CAP channel acts as a transport channel for the transport session. The stream manager 802 then sets the data connection into a streaming state, ready to accept streaming media, such as an audio stream, from the application layer 702 through a stream start procedure.

Figure 10:
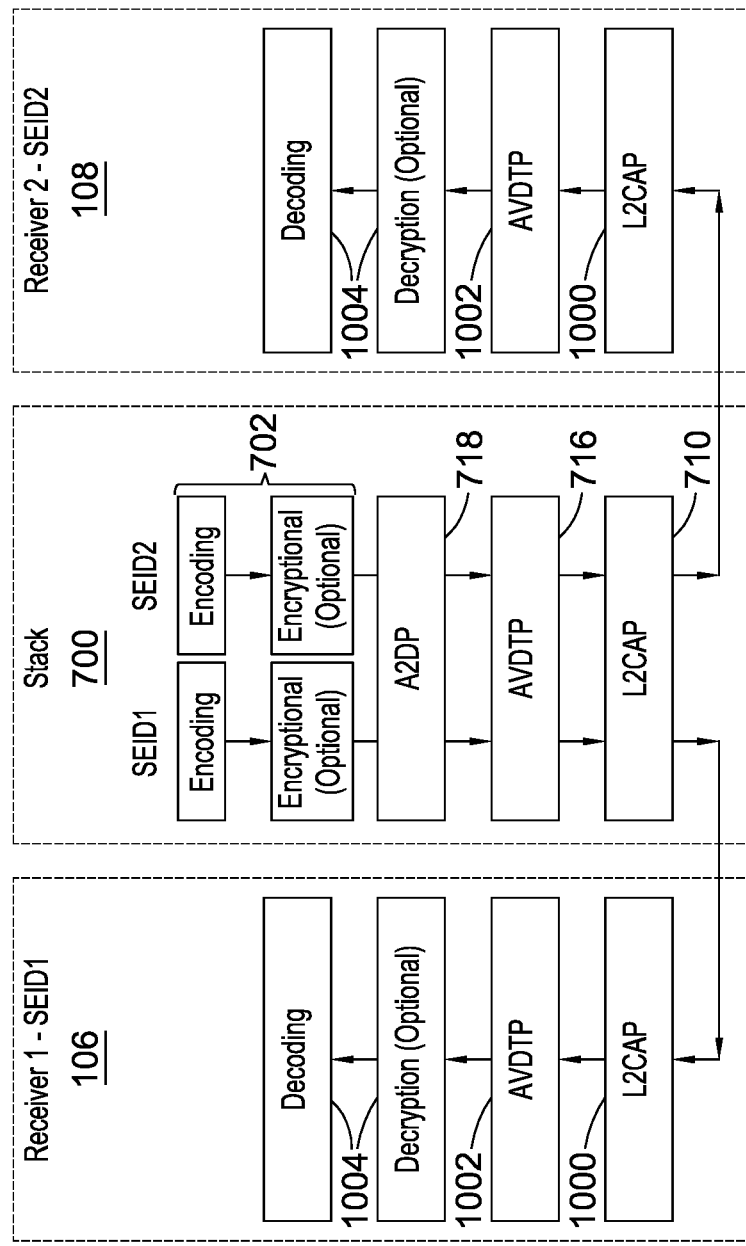
FIG. 10 illustrates an example data flow in the stack of FIG. 7.

FIG. 10 illustrates a data flow in the Bluetooth stack 700. In the example of FIG. 10, the stream manager 802 has assigned a first SEID, SEID1, to the first end point 106, and a second SEID, SEID2, to the second end point 108. The Bluetooth stack 700 stores the first and second SEIDs and provides the SEIDs to the application layer 702. At the application layer 702, a first audio stream addressed to the first end point 106 via the first SEID is encoded and may optionally be encrypted. Similarly, the application layer 702 encodes and optionally encrypts a second audio stream addressed to the second end point 108 via the second SEID.

Each encoded (and encrypted, if applicable) audio stream is passed to the A2DP 718 which prepares the audio streams for transmission to the respective end point 106, 108. The audio streams are passed to the AVDTP 716 which establishes the data connections with the end points 106, 108. The audio streams are passed to the L2CAP 710 which segments the audio streams into data packets for transmission. The data packets of the first audio stream are transmitted to the first end point 106, and the data packets of the second audio stream are transmitted to the second end point 108.

The transmitted data packets are received by respective L2CAPs 1000 of the end points 106, 108. The L2CAPs assemble the received data packets and pass the reassembled audio streams to AVTDPs 1002 of the end points 106, 108. The application layers 1004 of the end points 106, 108 decrypt, if necessary, and decode the audio streams. The respective audio streams are then output by the speakers 204 of the end points 106, 108, for example, using a Digital-to-analog converter.

Figure 11:
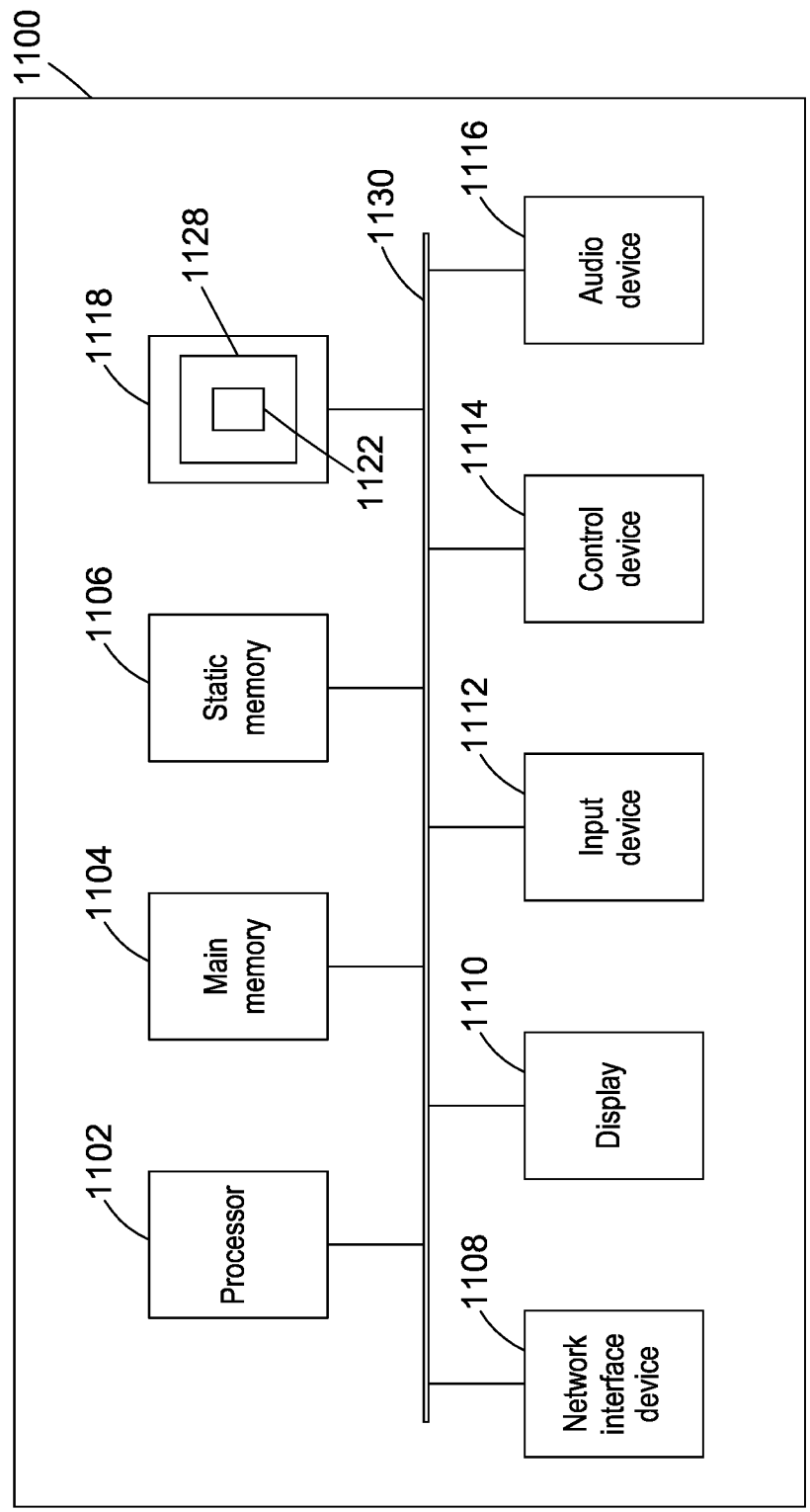
FIG. 11 illustrates a block diagram of one implementation of a computing device.

FIG. 11 illustrates a block diagram of one implementation of a computing device 1100, for example implementing an information appliance 100 as described above, within which a set of instructions, for causing the computing device to perform any one or more of the methodologies discussed herein, may be executed. In alternative implementations, the computing device may be connected (e.g., networked) to other machines in a Local Area Network (LAN), an intranet, an extranet, or the Internet. The computing device may operate in the capacity of a server or a client machine in a client-server network environment, or as a peer machine in a peer-to-peer (or distributed) network environment. The computing device may be a personal computer (PC), a tablet computer, a set-top box (STB), a web appliance, a server, a network router, switch or bridge, or any machine capable of executing a set of instructions (sequential or otherwise) that specify actions to be taken by that machine. Further, while only a single computing device is illustrated, the term "computing device" shall also be taken to include any collection of machines (e.g., computers) that individually or jointly execute a set (or multiple sets) of instructions to perform any one or more of the methodologies discussed herein.

The example computing device 1100 includes a processing device 1102, a main memory 1104 (e.g., read-only memory (ROM), flash memory, dynamic random access memory (DRAM) such as synchronous DRAM (SDRAM) or Rambus DRAM (RDRAM), etc.), a static memory 1106 (e.g., flash memory, static random access memory (SRAM), etc.), and a secondary memory (e.g., a data storage device 1118), which communicate with each other via a bus 1130.

Processing device 1102 represents one or more general-purpose processors such as a microprocessor, central processing unit, or the like. More particularly, the processing device 1102 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1102 may also be one or more special-purpose processing devices such as an application specific integrated circuit (ASIC), a field programmable gate array (FPGA), a digital signal processor (DSP), network processor, or the like. Processing device 1102 is configured to execute the processing logic (instructions 1122) for performing the operations and steps discussed herein.

The computing device 1100 may further include a network interface device 1108. The computing device 1100 also may include a video display unit 1110 (e.g., a liquid crystal display (LCD) or a cathode ray tube (CRT)), an alphanumeric input device 1112 (e.g., a keyboard or touchscreen), a control device 1114 (e.g., a mouse or touchscreen), and an audio device 1116 (e.g., a speaker).

The data storage device 1118 may include one or more machine-readable storage media (or more specifically one or more non-transitory computer-readable storage media) 1128 on which is stored one or more sets of instructions 1122 embodying any one or more of the methodologies or functions described herein. The instructions 1122 may also reside, completely or at least partially, within the main memory 1104 and/or within the processing device 1102 during execution thereof by the computer system 1100, the main memory 1104 and the processing device 1102 also constituting computer-readable storage media.

The various methods described above may be implemented by a computer program. The computer program may include computer code arranged to instruct a computer to perform the functions of one or more of the various methods described above. The computer program and/or the code for performing such methods may be provided to an apparatus, such as a computer, on one or more computer readable media or, more generally, a computer program product. The computer readable media may be transitory or non-transitory. The one or more computer readable media could be, for example, an electronic, magnetic, optical, electromagnetic, infrared, or semiconductor system, or a propagation medium for data transmission, for example for downloading the code over the Internet. Alternatively, the one or more computer readable media could take the form of one or more physical computer readable media such as semiconductor or solid state memory, magnetic tape, a removable computer diskette, a random access memory (RAM), a read-only memory (ROM), a rigid magnetic disc, and an optical disk, such as a CD-ROM, CD-RAY or DVD.

In an implementation, the modules, components and other features described herein (for example, the wireless communication module 302 or the display controller 306 described in relation to FIG. 3, or all or part of the Bluetooth stack 700 described in relation to FIG. 7) can be implemented as discrete components or integrated in the functionality of hardware components such as ASICS, FPGAs, DSPs or similar devices.

A "hardware component" is a tangible (e.g., non-transitory) physical component (e.g., a set of one or more processors) capable of performing certain operations and may be configured or arranged in a certain physical manner. A hardware component may include dedicated circuitry or logic that is permanently configured to perform certain operations. A hardware component may be or include a special-purpose processor, such as a field programmable gate array (FPGA) or an ASIC. A hardware component may also include programmable logic or circuitry that is temporarily configured by software to perform certain operations.

Accordingly, the phrase "hardware component" should be understood to encompass a tangible entity that may be physically constructed, permanently configured (e.g., hardwired), or temporarily configured (e.g., programmed) to operate in a certain manner or to perform certain operations described herein.

In addition, the modules and components can be implemented as firmware or functional circuitry within hardware devices. Further, the modules and components can be implemented in any combination of hardware devices and software components, or only in software (e.g., code stored or otherwise embodied in a machine-readable medium or in a transmission medium).

Unless specifically stated otherwise, as apparent from the following discussion, it is appreciated that throughout the description, discussions utilizing terms such as "receiving", "determining", "comparing", "identifying," or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

It is to be understood that the above description is intended to be illustrative, and not restrictive. Many other implementations will be apparent to those of skill in the art upon reading and understanding the above description. Although the present disclosure has been described with reference to specific example implementations, it will be recognized that the disclosure is not limited to the implementations described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method for wireless media distribution, the method comprising:
   determining, by a signaling administrator of a source device, first media stream capabilities of a first device that is connected to the source device during a first time period using a Bluetooth protocol;
   associating a first Stream End Point Identifier (SEID) with the first device;
   determining, by the signaling administrator, second media stream capabilities of a second device that is connected to the source device during the first time period using the Bluetooth protocol;
   associating a second SEID with the second device, the first SEID and the second SEID comprised within a same Bluetooth stack;
   allocating, based at least in part on the first media stream capabilities, first bandwidth to a first advanced audio distribution profile (A2DP) that is associated with the first device;
   allocating, based at least in part on the second media stream capabilities, second bandwidth to a second A2DP that is associated with the second device, wherein the combination of first bandwidth and second bandwidth is less than a maximum A2DP bandwidth;
   using at least the first SEID to establish a first Bluetooth audio channel between the source device and the first device, the first Bluetooth audio channel having the first bandwidth;
   using at least the second SEID to establish a second Bluetooth audio channel between the source device and the second device, the second Bluetooth audio channel having the second bandwidth;
   sending, during the first time period, a first audio stream from the source device over the first Bluetooth audio channel to the first device; and
   sending, during the first time period, a second audio stream from the source device over the second Bluetooth audio channel to the second device, the first audio stream different from the second audio stream.

2. The method of claim 1, further comprising:
   receiving a media stream at an application layer, the media stream including at least a video stream, the first audio stream and the second audio stream;
   associating the first audio stream with the first device, based on a user selection and the first SEID; and
   associating the second audio stream with the second device, based on the user selection and the second SEID.

3. The method of claim 1, further comprising:
   encoding, by a baseband layer, the first audio stream prior to sending the first audio stream from the source device to the first device; and
   encoding, by the baseband layer, the second audio stream prior to sending the second audio stream from the source device to the second device.

4. The method of claim 1, further comprising:
   encrypting, by a baseband layer, the first audio stream prior to sending the first audio stream from the source device to the first device; and
   encrypting, by the baseband layer, the second audio stream prior to sending the second audio stream from the source device to the second device.

5. The method of claim 1, wherein the first media stream capabilities include media codec capabilities of the first device.

6. The method of claim 1, wherein the first device includes one of a headphone, earphone, speaker, set of speakers or a headset.

7. The method of claim 1, wherein the source device is a set top box.

8. The method of claim 1, wherein the first audio stream is in a first language, and the second audio stream is in a second language, the first language different from the second language.

9. The method of claim 1, wherein the first device has both audio and video capabilities, the method further comprising sending, during the first time period, a video stream with the first audio stream from the source device to the first device.

10. A source device for wireless media distribution comprising:
    a processor configured to:
      determine, by a signaling administrator of the source device, first media stream capabilities of a first device that is connected to the source device during a first time period using a Bluetooth protocol;
      associate a first Stream End Point Identifier (SEID) with the first device;
      determine, by the signaling administrator, second media stream capabilities of a second device that is connected to the source device during the first time period using the Bluetooth protocol;

associate a second SEID with the second device, the first SEID and the second SEID comprised within a same Bluetooth stack;

allocate, based at least in part on the first media stream capabilities, first bandwidth to a first advanced audio distribution profile (A2DP) that is associated with the first device;

allocate, based at least in part on the second media stream capabilities, second bandwidth to a second A2DP that is associated with the second device, wherein the combination of first bandwidth and second bandwidth is less than a maximum A2DP bandwidth;

use at least the first SEID to establish a first Bluetooth audio channel between the source device and the first device, the first Bluetooth audio channel having the first bandwidth;

use at least the second SEID to establish a second Bluetooth audio channel between the source device and the second device, the second Bluetooth audio channel having the second bandwidth;

send, during the first time period, a first audio stream from the source device over the first Bluetooth audio channel to the first device; and send, during the first time period, a second audio stream from the source device over the second Bluetooth audio channel to the second device, the first audio stream different from the second audio stream.

11. The source device of claim 10, wherein the processor is further configured to:

receive a media stream at an application layer, the media stream including at least a video stream, the first audio stream and the second audio stream;

associate the first audio stream with the first device, based on a user selection and the first SEID; and associate the second Bluetooth audio stream with the second device, based on the user selection and the second SEID.

12. The source device of claim 10, wherein the processor is further configured to:

encode, by a baseband layer, the first audio stream prior to sending the first audio stream from the source device to the first device; and encode, by the baseband layer, the second audio stream prior to sending the second audio stream from the source device to the second device.

13. The source device of claim 10, wherein the processor is further configured to:

encrypt, by a baseband layer, the first audio stream prior to sending the first audio stream from the source device to the first device; and encrypt, by the baseband layer, the second audio stream prior to sending the second audio stream from the source device to the second device.

14. The source device of claim 10, wherein the first media stream capabilities include media codec capabilities of the first device.

15. The source device of claim 10, wherein the first device includes one of a headphone, earphone, speaker, set of speakers or a headset.

16. The source device of claim 10, wherein the source device is a set top box.

17. The source device of claim 10, wherein the first audio stream is in a first language, and the second audio stream is in a second language, the first language different from the second language.

18. The source device of claim 10, wherein the processor is further configured to send during the first time period, a video stream with the first audio stream from the source device to the first device.

\* \* \* \* \*